(12) United States Patent
Wils

(10) Patent No.: US 10,210,067 B1
(45) Date of Patent: Feb. 19, 2019

(54) SPACE ACCOUNTING IN PRESENCE OF DATA STORAGE PRE-MAPPER

(71) Applicant: EMC IP Holding Company LLC, Hopkinton, MA (US)

(72) Inventor: Joris Wils, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/662,727

(22) Filed: Jul. 28, 2017

(51) Int. Cl.
G06F 12/10 (2016.01)
G06F 11/30 (2006.01)
G06F 12/0864 (2016.01)
G06F 12/0873 (2016.01)

(52) U.S. Cl.
CPC ...... G06F 11/3037 (2013.01); G06F 12/0864 (2013.01); G06F 12/0873 (2013.01); *G06F 2201/80* (2013.01)

(58) Field of Classification Search
CPC ............. G06F 11/3037; G06F 12/0873; G06F 12/0864
USPC .......................................................... 711/150
See application file for complete search history.

(56) References Cited

U.S. PATENT DOCUMENTS 5,218,698 A * 6/1993 Mandl ................. G06F 12/0269 711/165
2007/0291608 A1* 12/2007 Hoshizawa ............ G11B 20/10 369/53.16
2008/0183777 A1* 7/2008 Xi ...................... G06F 17/30067

OTHER PUBLICATIONS

Rasmus Pagh, "Cuckoo Hashing for Undergraduates", IT University of Copenhagen, pp. 1-6, Mar. 27, 2006.
Li, et al., "Algorithmic Improvements for Fast Concurrent Cuckoo Hashing", EuroSys '14, pp. 1-14, Amsterdam, Netherlands, Apr. 13-16, 2014.
Rosenblum et al., "The Design and Implementation of a Log-Structured File System", Proceedings of the 13th ACM Symposium on Operating Systems Principles and ACM Transactions on Computer Systems pp. 1-15, (1992).

* cited by examiner

*Primary Examiner* — Jae U Yu
(74) *Attorney, Agent, or Firm* — Ryan, Mason & Lewis, LLP

(57) ABSTRACT

A mapping apparatus comprises a mapper that translates from an input key to an output key in one or more storage devices. A pre-mapper for processing update operations comprises a plurality of mapping tablets and an in-memory look-up filter to identify a given mapping table storing a given input key. The mapping tablets comprise at least one dynamic in-memory ingress tablet and a plurality of persisted frozen tablets. For a given update operation, a first entry is added to one dynamic in-memory ingress tablet comprising the input key for the given update operation and a corresponding output key where data for the given update operation is stored; and a second entry is added to the look-up filter comprising the input key of the first entry and an identifier of the dynamic in-memory ingress tablet storing the first entry for the given update operation. The dynamic in-memory ingress tablet is persisted as a persisted frozen tablet. Space accounting accounts for usage of the storage devices by a given write operation of a given data offset as one of a new write operation and an overwrite operation.

20 Claims, 14 Drawing Sheets

450

Inputs: ShardLowerBound (SLB), ShardUpperBound (SUB), & TabletAndMapRefs[]

1. For each tablet/map:
   // set each cursor at first entry of its tabletOrMap that is greater than or equal to SLB
   a. Cursor[tablet] = FindGreaterOrEqualEntry(TabletAndMapRef[tablet], SLB)
      // if cursor hits notfound or exceeds SUB, then
   b. If (Cursor[tablet] == ∅ OR Cursor[tablet].Key > SUB) Then disable cursor
2. MinCursorKey = SUB
3. For each tablet/map: (in order from oldest to newest (map being oldest))
   If (Cursor[tablet].Key <= MinCursorKey) // find most recent version of lowest key
      MinTablet = tablet
      MinCursorKey = Cursor[tablet].Key
4. Append(NewShard, Cursor[MinTablet])  // append cursor address & value to new shard
   // increment cursors at MinCursorKey
5. For each tablet:
   a. If (Cursor[tablet].Key == MinCursorKey)
      // increment cursors at MinCursorKey
      Cursor[tablet] = FindGreaterThanEntry(TabletOrMapRef[MinTablet], MinCursorKey)
   b. If (Cursor[tablet] == ∅ OR Cursor[tablet].Key > SUB) then disable cursor
6. If (any cursors still enabled) go to Step 2.

FIG. 4B

Write Operation Process For Sparse Bitmap Embodiment

560 - Determine if write operation is a new write or an overwrite by first searching pre-mapper 110 for key K;

570 - If pre-mapper search misses, search sparse bitmap 530 for key K;

580 - If pre-mapper 110 or sparse bitmap 550 have an entry for key K, then write is an overwrite operation, otherwise write is a new write operation.

Read Operation Process For Volume Cloning Embodiment

Given: volume address B, converted to key K by including range

710 - Search pre-mapper 110 for key K assigned to volume. If hit, return the found associated data, otherwise continue;

720 - Search BOD 180 for key K to find parent range associated with volume. Then, convert volume address B to use key L within parent range. Then, search pre-mapper 110 again for key L. If hit, return found associated data, otherwise continue;

730 - Search BOD 180 for associated parent range to find grandparent range. If found, then go back to step 720 using grandparent range as parent range. If not found, then continue;

740 - Search Volume for last used key (K, L, ...). If hit, return found associated data, otherwise return NotFound.

VMV Reconstruction Process For Volume Cloning Embodiment

750

755 - Increment Pre-mapper Epoch (PME). All new entries will be tagged with new PME value;

760 - Select entries in BOD 180 tagged with previous PME value;

765 - Sort selected BOD entries such that for each existing key range, its ancestry is known;

770 - Shard VMV construction such that key ranges that share ancestry are together in a shard;

775 - For a given ancestry within a shard, perform the following steps:
   a. Reconstruct ancestral range of ancestry in new VMV by running VMV Reconstruction Process 400 with, as inputs, Lower and Upper Bounds of ancestral range; frozen tablets from previous PME and volume map.
   b. When ancestral range is complete, reconstruct its child ranges in new VMV by running Step 775a, with each child range as ancestral range
   c. Redo step 775.b for grandchild ranges, and so on.

780 – When the shard is constructed, exchange shard with previous shard in volume map, and then delete previous shard.

785 – Remove all entries from Cuckoo Filter associated with shard.

790 – When all shards have been constructed:
   a. Delete entries in BOD 180 tagged with previous PME; and
   b. Delete frozen tablets associated with the previous PME.

FIG. 7B

SPACE ACCOUNTING IN PRESENCE OF DATA STORAGE PRE-MAPPER

CROSS-REFERENCE TO RELATED APPLICATIONS

The present application is related to U.S. patent application Ser. No. 15/662,719, entitled "Contention and Metadata Write Amplification Reduction In Log Structured Data Storage Mapping," and U.S. patent application Ser. No. 15/662,733, entitled "Storage Element Cloning In Presence Of Data Storage Pre-Mapper," each filed contemporaneously herewith, assigned to the assignee of the present application and incorporated by reference herein in its entirety.

FIELD

The field relates generally to storage mapping techniques for identifying the physical storage location of a given data item.

BACKGROUND

Storage systems often employ mapping techniques to map an input key, such as a logical storage address, to an output key identifying a physical storage address in a storage device. Conventional mapping techniques, however, often suffer from map contention issues, as well as metadata write amplification, whereby the number of metadata write operations needed per user data write increases over time. Metadata write amplification can reduce throughput, increase latency and cause extra wear on the physical storage media.

A need therefore exists for improved storage mapping techniques.

SUMMARY

In one embodiment, a mapping apparatus is provided for identifying the physical storage location of a given data item. The exemplary mapping apparatus comprises a mapper, such as a volume mapper, that translates from an input key to an output key in one or more storage devices. An exemplary pre-mapper for processing update operations comprises a plurality of mapping tablets and an in-memory look-up filter to identify a given mapping table storing a given input key. The plurality of mapping tablets comprises at least one dynamic in-memory ingress tablet and a plurality of persisted frozen tablets. For a given received update operation, a first entry is added to one of the dynamic in-memory ingress tablets comprising the input key for the given received update operation and a corresponding output key where data for the given received update operation is stored in the storage devices; and a second entry is added to the look-up filter comprising the input key of the first entry and an identifier of the dynamic in-memory ingress tablet storing the first entry for the given received update operation. The dynamic in-memory ingress tablet is persisted as one of the plurality of persisted frozen tablets when the dynamic in-memory ingress tablet satisfies one or more predefined capacity criteria. A space accounting is performed to account for a usage of the one or more storage devices by a given write operation of a given data offset as one of a new write operation and an overwrite operation.

Other illustrative embodiments include, without limitation, apparatus, systems, methods and computer program products comprising processor-readable storage media.

BRIEF DESCRIPTION OF THE DRAWINGS

FIG. 4B illustrates exemplary pseudo code for a write operation process, according to a sparse bitmap embodiment of the disclosure;

FIG. 5B illustrates exemplary pseudo code for a write operation process, according to a sparse bitmap embodiment of the disclosure

FIG. 7A illustrates exemplary pseudo code for a read operation process, according to a volume cloning embodiment of the disclosure;

FIG. 7B illustrates an exemplary VMV reconstruction process, according to a volume cloning embodiment of the disclosure;

DETAILED DESCRIPTION

Figure 1:
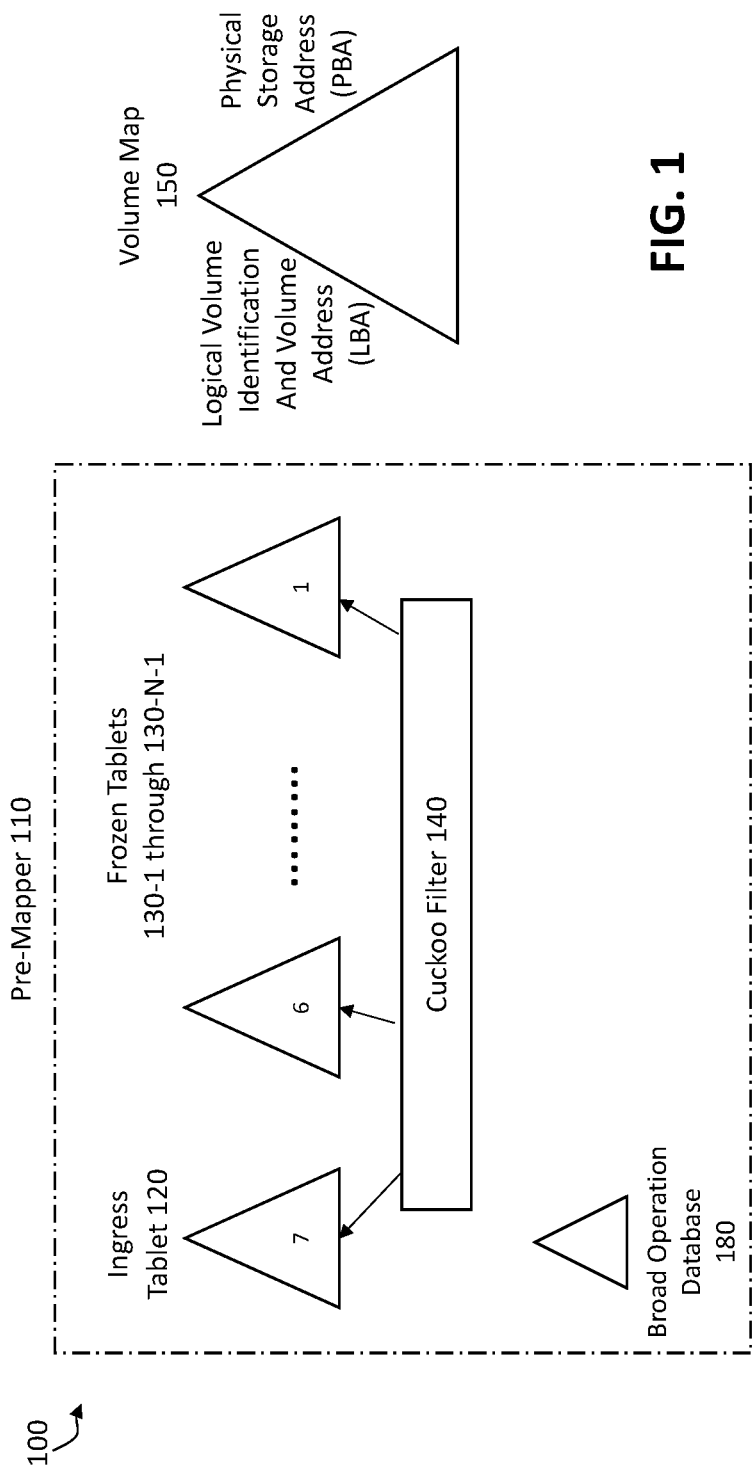
FIG. 1 illustrates an exemplary virtual volume appliance, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide mapping methods and mapping apparatus for identifying the physical storage location of a given data item. While the exemplary embodiments are described herein primarily in the context of virtual storage volumes, aspects of the present disclosure can be applied to other forms of storage, such as databases, as would be apparent to a person of ordinary skill in the art, based on the present disclosure.

In one or more embodiments, a mapping apparatus is provided for identifying the physical storage location of a given data item. The mapping apparatus may be implemented, for example, as a virtual volume appliance where an input key comprises a logical volume identifier and a data offset and an output key comprises a physical storage address. In another implementation, the mapping apparatus is a database system where the input key comprises a key to a record in the database system and the output key comprises a pointer to a physical storage device where the record is stored.

Volume Mapping

A virtual volume is a block addressable entity that stores data in blocks. Typical block sizes are 512 and 4096 bytes. The most commonly used protocol to access such volumes is Small Computer System Interface (SCSI).

A system that serves up Virtual Volumes typically has access to private storage on physical disks or to storage on a remote service such as cloud storage. An initiator issues the reads and writes. The system stores the virtual volume blocks in possibly compressed sets of bytes called chunks on the private storage. The system uses metadata to track the mapping between the blocks on the virtual volumes and the storage blocks on its storage media.

A popular technique on which to base such virtual volume appliances is log structured storage (LSS). In log structured storage, the chunks from one or many virtual volumes are stored on fixed sized partitions of storage media called segments. New writes are directed into a small number of active segments. A volume mapping database maintains the relationship between the volume and address of each write to the location of the associated chunk in a segment. When an active segment is full, its contents are frozen and a new segment is allocated to take its place. This technique allows for efficient handling of new writes; particularly, if the appliances use compression or other data reduction techniques. If the storage media is a Solid State Disk (SSD), then read performance is also good.

For additional details regarding suitable Log-Structured File Systems, see, for example, John K. Ousterhout and Mendel Rosenblum, "The Design and Implementation of a Log-Structured File System," ACM Transactions on Computer Systems (February 1992), incorporated by reference herein in its entirety.

Modern Solid State Disk-based Virtual Volume appliances typically store their metadata in a separate database in order to take advantage of the low random access latency of SSDs. This is a common variation of Log Structured Storage.

Metadata Write Amplification

Data reduction is most efficient when the units of storage are small. The units of storage, often referred to as "Pages," are often as small as 4 kiB (kibibytes). These small units create significant challenges for existing virtual volume systems. First, the number of metadata updates per Page update is typically large. The term "metadata write amplification" (MWA) refers to the number of metadata writes needed per user data write. Existing virtual volume systems have a worst case MWA on the order of 200% or more, depending on the write pattern. High MWA reduces throughput, increases latency and causes extra wear on the metadata physical media. The metadata physical media is considered the most expensive in a storage device, so excess wear causes excess cost. In addition, the replacement of worn metadata physical media is complex and often causes disruption to the device's availability.

Metadata Contention

Another challenge is metadata contention (MDC). Current virtual volume devices have multiple cores and thus can perform operations in parallel. The number and frequency of metadata is typically so high that maintaining data integrity requires careful metadata management, typically done with locking. The contention on this locking is often the primary performance constraint in existing virtual volume systems. That is, the throughput of the device does not increase linearly with the number of available cores. Instead, the throughput level with increasing cores levels off.

MDC, in essence, shortens the lifetime of a product design. Over time, as core counts increase, the MDC limited product lines become relatively slower as compared to devices that can take advantage of the increasing number of cores.

Additionally, the multi-threaded software is complex. Race conditions and dead locks are difficult to avoid. Those issues cause the current devices to corrupt user data and/or stall, rendering the product as unstable and/or unreliable.

Unsatisfactory Mitigations

Existing virtual volume systems attempt to reduce MWA and MDC with Ingress Buffers that contain lots of random access memory (RAM) and fast persistent storage. These improve the device, but they are costly and constrained in size.

Contention and Metadata Write Amplification Reduction

In one or more embodiments, the disclosed contention and metadata write amplification reduction techniques reduce the metadata write amplification, for example, to about 6%, and reduce the impact of contention to negligible levels. Therefore, the lifetime of metadata storage is extended, the performance is increased and/or the software complexity is decreased.

FIG. 1 illustrates an exemplary virtual volume appliance 100, according to one embodiment of the disclosure. As shown in FIG. 1, the exemplary virtual volume appliance 100 comprises a pre-mapper 110 and a volume map 150.

The exemplary pre-mapper 110 comprises a small in-memory dynamic key/value (KV) store, referred to as an ingress tablet 120 (typically protected by a log), a set of N−1 persisted frozen KV stores 130-1 through 130-N−1, a dynamic hash function, such as a Cuckoo Filter 140 (optionally persisted from time to time) and a broad operation database (BOD) 180. Generally, the disclosed pre-mapper 110 absorbs changes, including IO (input/output) and management updates (e.g., volume deletes). Each of the N KV stores of the pre-mapper 110 in the exemplary embodiment has a unique identifier number. N is typically less than 100. In at least one embodiment, the pre-mapper 110 is substantially optimized for absorbing change with substantially minimal memory use, write amplification and contention.

The exemplary Cuckoo Filter 140 is discussed further below in a section entitled "Cuckoo Filter 140." Generally, a Cuckoo Filter has a superset of the properties of a Bloom Filter, including small size, true negative and false positives. For a given false positive rate, the size of a Cuckoo Filter is about the same as the size of a Bloom Filter. Beyond a Bloom Filter, a Cuckoo Filter supports associated data, deletes, predictable read time and can be used even if on disk. See, for example, Rasmus Pagh and Flemming Friche Rodler, "Cuckoo Hashing," Algorithms—ESA 2001. Lecture Notes in Computer Science 2161, pages 121-33 (2001); Bin Fan et al., "Cuckoo Filter: Practically Better Than Bloom," Proc. 10th ACM Int. Conf. Emerging Networking Experiments and Technologies (CoNEXT '14), pages 75-88 (2014); and/or X. Li et al., "Algorithmic Improvements for Fast Concurrent Cuckoo Hashing," EuroSys 2014 (2014), each incorporated by reference herein in its entirety. In one or more embodiments, updates to the pre-mapper 110 work as follows. The data of an IO update is stored in a free location in the physical storage of the disclosed virtual volume appliance. An entry is added to the dynamic KV store ingress tablet 120, where the key is the volume LBA (logical block address), and the associated value data is a reference to the location of the data within the volume. An entry is added to the Cuckoo Filter 140, where the key is the volume LBA and the associated value data is the dynamic identifier of the KV store ingress tablet 120. When the dynamic KV store ingress tablet 120 grows to a threshold, the dynamic KV store ingress tablet 120 is frozen and a new dynamic KV store takes its place, as discussed further below in conjunction with FIG. 2. The newly frozen KV store is written to disk as a persistent KV store, such as a B-Tree (self-balancing tree data structure). Immediately thereafter, the Cuckoo Filter 140 is written to disk. After these two steps, the log can be discarded.

Over time, the pre-mapper 110 accumulates multiple KV stores in the form of one or more ingress tablets 120 and N-1 frozen tablets 130. To support a read, the pre-mapper 110 uses the volume LBA to retrieve the KV store identification (e.g., identifying a given tablet 120 or 130) from the Cuckoo Filter 140. Then, the pre-mapper 110 uses the volume LBA to retrieve the data location from the selected KV store (e.g., a given tablet 120 or 130).

A new version of the main volume map 150 is written, whenever a time or activity threshold is reached. In one or more embodiments, the new version of the volume map 150 is constructed off to the side, while read IO traffic uses the existing version of the volume map 150. The new version of the volume map 150 contains the combined contents of the pre-mapper 110 and the main volume map 150. When the rewrite is done, the rewritten version of the volume map 150 replaces the existing version of the volume map 150 in a low contention fashion and the pre-mapper 110 is cleared in a low contention fashion. The rewrite is done using map sharding to reduce the space usage of the separate version of the volume map 150, while under construction. Since the rewrite is done to the side, it can be done entirely in the background so that user IO does not incur any contention.

It can be shown that in common usage cases, far fewer metadata writes are required to construct the new version of the volume map 150 than the number of user data writes, thereby bringing metadata write amplification to negligible levels. One or more embodiments of the disclosure increase the lifetime of the metadata media by an order of magnitude or more; and improve write throughput to rise linearly with the number of cores, until other constraints (e.g., IO and RAM throughput) are hit. Meanwhile, latency spikes are substantially avoided due to contention on the volume metadata.

In one variation, space accounting is employed with delayed timeliness. In another variation, timely space accounting is employed, but extra overhead is incurred. Both cases demonstrate better performance than existing virtual volume systems.

If the disclosed virtual volume system crashes and needs to recover, the changes that occurred shortly before the crash are read from the log. The changes are applied to rebuild a dynamic KV store ingress tablet 120. During this time, read operations must first read the KV store ingress tablet 120 and then the Cuckoo Filter 140. The Cuckoo Filter 140 is read from disk for reads. Over time, the main Cuckoo Filter 140 is fully in memory after which it can be updated with the contents of the dynamic KV store ingress tablet 120, after which operations occur at full speed.

It can be shown that one or more implementations of the disclosure improve over existing virtual volume systems. The disclosed exemplary virtual volume appliance 100 substantially eliminates contention on the Volume Map 150. Without this contention as a constraint, performance will rise with the number of CPUs until other constraints are hit, such as IO or memory speed. In addition, the disclosed exemplary virtual volume appliance 100 reduces the metadata writes by an order of magnitude compared to existing virtual volume systems, thereby significantly increasing the lifetime of the physical media on which metadata is stored. Further, the reduction in contention and metadata writes will increase average sustained write throughput, increase read throughput and reduce read latency spikes. In addition, the absence of contention and complex locking simplifies the software and decreases its development time and cost.

Cuckoo Filter 140

The Cuckoo Filter 140 is a variant of the Cuckoo Hash presented by Bin Fan. See, e.g., B. Fan, "Cuckoo Filter: Practically Better Than Bloom," *CoNEXT*'14, Sydney Australia (2014), incorporated by reference herein in its entirety. Using the techniques described by Li, a Cuckoo Filter 140 can be made fully concurrent supporting multiple readers and writers with low contention overhead. See, e.g., X. Li, "Algorithmic Improvements for Fast Concurrent Cuckoo Hashing," *EuroSys*'14, Amsterdam Netherlands, (2014), incorporated by reference herein in its entirety. The Cuckoo Hash has been shown to have high density of up to 95%, although insertion times can be high at such high densities.

A Cuckoo Filter 140 requires the computation of two hashes of the key H1(key) and H2(key). The exemplary Cuckoo Filter 140 comprises a single array. Entries are stored in one of two possible locations Array[H1(key)] or Array[H1(key)^H2(key)]. An entry has two elements: H2(key) and associated data. Therefore, for any entry in the array, its alternate location can be found by applying the H2(key) to its current location. It is assumed that the H1(key) is of some value $0 \ldots 2^r-1$, where r is the number of bits allocated to it. The H2(key) must be a value $0 \ldots$ FilterSize-1.

In one or more embodiments, the exemplary Cuckoo Filter 140 has the following properties:
  It returns a true negative;
  It returns false positives at a probability $2*2^{-r}*\#$sets associative;
  It requires at most two array reads to return a result;
  It supports deletes;
  It is substantially guaranteed to converge when density is 50% or better;
  Insert time is non-determinate, but many implementations have means to manage that;
  It can be used if on disk, because it only requires two reads;
  It supports associated data;
  It supports substantially concurrent read and write operations with negligible lock overhead; and
  It is small, so it normally resides substantially entirely in memory. Here each entry is 2 Bytes.

One or more embodiments of the disclosure provide a volume emulation apparatus comprising two elements: a volume map 150 and a pre-mapper 110. The volume map 150 is assumed to be some form of Key Value store that converts a logical volume identification and a volume address (LBA) into a physical storage address (PBA), as shown in FIG. 1.

Pre-Mapper 110 Components

As indicated above, the exemplary pre-mapper 110 comprises an Ingress Tablet 120, multiple frozen Tablets 130, a Cuckoo Filter 140 (that references the tablets 120, 230) and a Broad Operation Database (BOD) 180. Each of the tablets is given a unique identifier number. Time is kept in pre-mapper epochs (PME).

In one or more embodiments, the exemplary ingress tablet 120 is a KV store that is small enough that it can exist substantially entirely in memory. The exemplary ingress tablet 120 is substantially optimized for high speed concurrent operations (e.g., both read and write). The ingress tablet 120 may be implemented, for example, as a Hash Table, a Binary Tree or a Skip List, as would be apparent to a person of ordinary skill in the art. Almost all of these implementations use a persistent sequential log, because of its low write overhead and contention avoidance properties. That is, updates to the ingress tablet 120 are written to the ingress tablet 120 and to the log. If the system crashes, then the log is read and the ingress tablet 120 is reconstructed.

The Key of the key-value pair is the volume identification and the data offset, typically in blocks, in the volume (LBA). The Value of the key-value pair is the physical storage address (PBA).

As noted above, there are N−1 frozen tablets 130, where N is likely less than 100. The exemplary frozen tablets 130 are implemented as persisted KV stores. That is, in one or more embodiments, the KV stores exist on disk and caches of their contents are stored in memory. As noted above, the key of the key/value pair is the volume identification and the data offset in the volume (VBA) and the associated value of the key/value pair is the PBA. The identification of the frozen tablets 130 is in the range 0 . . . N−1, and the Ingress tablet 120 also gets a unique identification out of the 0 . . . N−1 range.

In the exemplary Cuckoo Filter 140, the key is the VBA. The associated data is the tablet identification. The Cuckoo Filter 140 normally resides substantially entirely in memory. There is also optionally a disk based copy of the Cuckoo Filter 140.

The exemplary broad operation database (BOD) 180 is typically implemented as a small database in which large scale operations are recorded. Large scale operations comprise, for example, large unmap commands and volume delete commands. Each of these operations is assigned the current value of the PME. The key is a contiguous range of VBAs.

Pre-Mapper Operation

Initialization—When the pre-mapper 110 is first initialized, the pre-mapper 110 creates an empty ingress tablet 120 and a Cuckoo Filter 140. The Epoch is set to a start value (e.g., 0). The ingress tablet 120 is given identification 0. A pool of Tablet Identifications is created with N entries.

Write Operation—When a write operation on a given volume and volume offset K is received, the data contents of the write operation are written to a free location in the physical storage that is assigned a unique PBA. Existing techniques, such as Log Structured Storage (LSS), will assign such a location in a manner that is efficient for the physical storage.

An entry for the write operation is added to the ingress tablet 120 with key K as VBA and the PBA as the value. If there already is an entry with key K, then that entry is discarded and the referenced physical location is returned to the free pool. An entry is also added to the Cuckoo Filter 140 of which the key is K and the associated data the Ingress tablet 120 identification. In a further variation, the entry into the Cuckoo Filter 140 can optionally be deferred.

Figure 2:
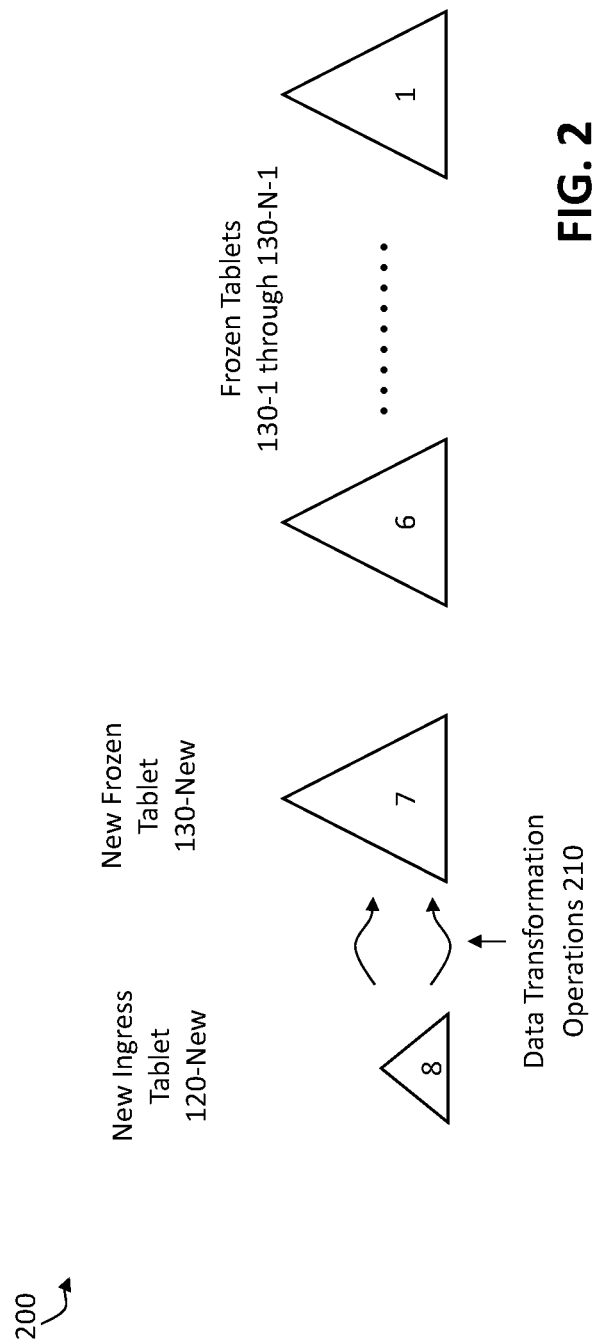
FIG. 2 illustrates an exemplary tablet freeze process for freezing the exemplary ingress tablet of FIG. 1, according to one embodiment of the disclosure.

Ingress tablet 120 Full—FIG. 2 illustrates an exemplary tablet freeze process 200 for freezing the exemplary ingress tablet 120 of FIG. 1, for example, when the ingress tablet 120 reaches a predefined threshold size, according to one embodiment of the disclosure. Over time, the ingress tablet 120 will fill to a predefined threshold value (for example, after which the ingress tablet 120 is considered too big to fit in memory). When the threshold value is reached, the exemplary virtual volume appliance 100 instantiates a new ingress tablet 120-New and assigns the new ingress tablet 120-New a unique identifier. All further write operations are applied to the new ingress tablet 120-New.

The old ingress tablet 120 is used to construct a new frozen tablet 130-New with substantially the same contents (e.g., same {K, V} pairs) as the old ingress tablet 120. The new frozen tablet 130-New can be implemented, for example, as a persistent KV store, such as a B-Tree. Since the new frozen tablet 130-New is generally frozen and small for a persistent store, the new frozen tablet 130-New can be written to be optimized for fast read access.

In at least one embodiment, the exemplary process 200 for freezing the exemplary ingress tablet 120 optionally allows users to efficiently perform time intensive data transformation operations 210, such as Data Compression and Data Duplication as the metadata updates that such transformations require can be integrated into the frozen tablet construction.

After the new frozen tablet 130-New has been fully constructed, the Cuckoo Filter 140 is written to disk. Thereafter, the old ingress tablet 120 can be discarded. This cycle of ingress tablet 120 instantiation and frozen tablet 130-New construction continues indefinitely.

Broad Operations—Operations that have a large impact, that is, on many blocks of a volume, such as the SCSI Unmap commands and volume delete operations, are infrequent as compared to normal IO operations, but have a broad scope. Such broad operations can render indeterminately large portions of the pre-mapper 110 and Volume Maps 150 obsolete with one command. Therefore, in one or more embodiments, the actual processing of the broad commands is deferred and a fast method is optionally used to give the user the impression of an immediate execution.

These large operations are recorded in the broad operation database (BOD) 180, which is assumed to be relatively small. In one exemplary implementation, the broad operation database 180 only needed to contain about 30 minutes of operations. Each operation recorded in the broad operation database 180 is tagged with the current value of the PME.

Figure 3:
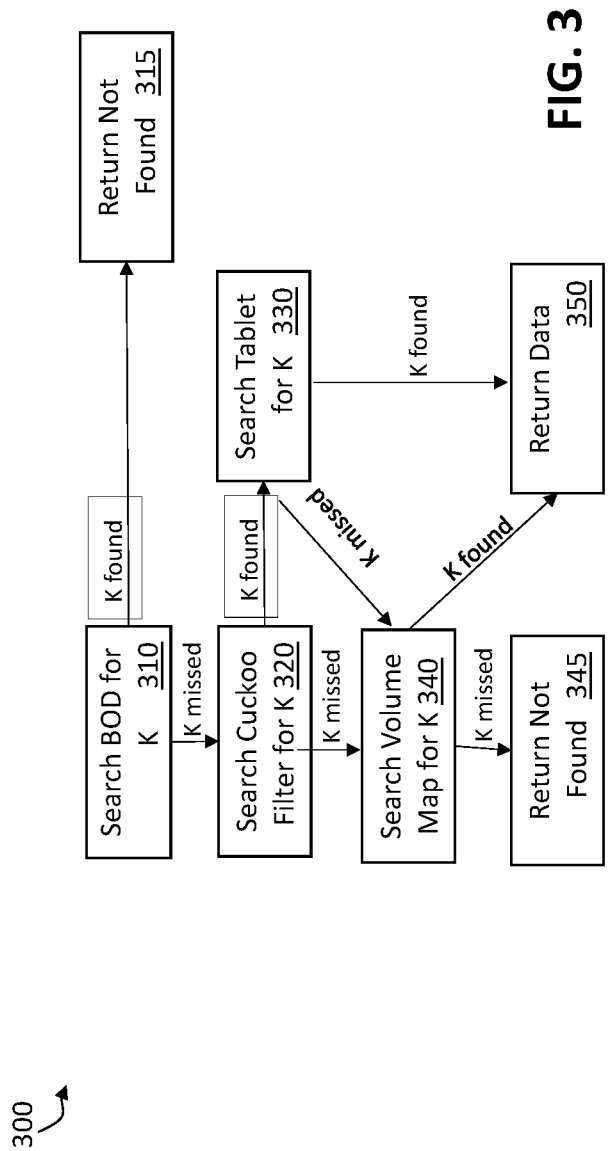
FIG. 3 illustrates an exemplary read process for processing a read operation with a given volume identification and offset, according to one embodiment of the disclosure.

Read Operation—FIG. 3 illustrates an exemplary read process 300 for processing a read operation with a given volume identification and offset, according to one embodiment of the disclosure. When a read operation is received with a given length and VBA, the read operation is treated as J=length/Page multiple operations of a page read, each at VBA plus offset: K. The virtual volume appliance 100 initially searches the BOD 180 during step 310 to see if K is still valid. If K is valid, then the apparatus searches the Cuckoo Filter 140 for K during step 320. If an entry is found in the Cuckoo Filter 140, the virtual volume appliance 100 searches the identified tablet for K during step 330.

If no entry is found in the Cuckoo Filter 140, or no entry is found in the tablet identified by the Cuckoo Filter 140, the virtual volume appliance 100 searches the Volume Map for K during step 340. If K is found in a tablet (step 330) or the volume map (step 340), then the virtual volume appliance 100 inspects the BOD 180 to see if K is still valid.

If the read of K succeeds, then the PBA of the data is known and the virtual volume appliance 100 returns the contents of the physical location during step 350. If key K is invalid per the BOD 180 (step 310) or not found in the Tablets or Volume Map (step 340), then the virtual volume appliance 100 returns not found to the reader during step 315 or 345, respectively.

Volume Map Version Reconstruction (VMV Reconstruction)

Figure 4A:
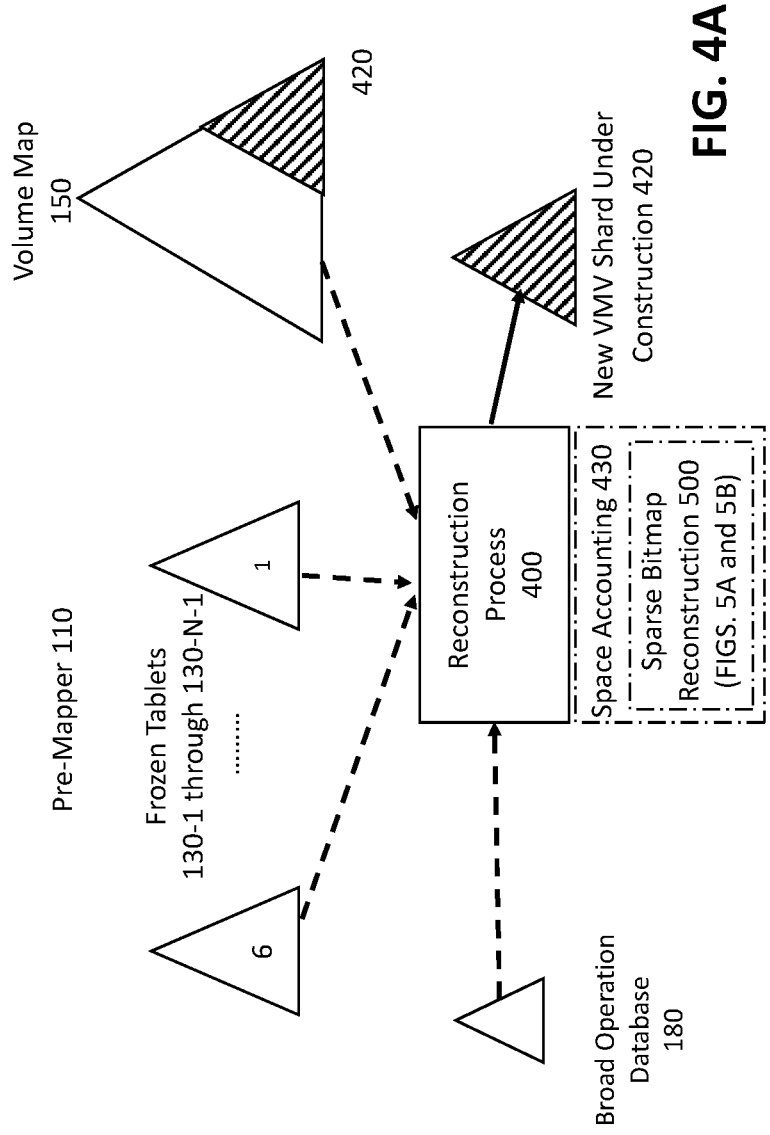
FIG. 4A is a flow chart of an exemplary Volume Map Version (VMV) reconstruction process, according to an embodiment of the disclosure.

When the total amount of data stored in the pre-mapper 110 reaches a threshold or a time limit has expired, the virtual volume appliance 100 increments the pre-mapper 110 Epoch (PME) and starts a procedure call Volume Map Version (VMV) reconstruction. FIG. 4A is a flow chart of an exemplary Volume Map Version (VMV) reconstruction process 400, according to an embodiment of the disclosure.

As shown in FIG. 4A, during the VMV reconstruction process 400, the Volume Map 150 and the frozen tablets 130 created in the previous PME are merged into a new VMV 420. In one or more embodiments, the merge happens to the side. That is, the existing Volume Map 150 is not changed during the reconstruction. Read IO traffic does not check the new Volume Map Version. Write IO traffic continues with creating a new ingress tablet 120 and frozen tablets 130.

The exemplary VMV reconstruction process 400 is optionally done in a sharded fashion. Sharding breaks up the key space of the frozen tablets 130 and Volume Map 150 into a modest number of ranges. Each range, called a "shard," is constructed separately.

The VMV reconstruction process 400 uses the entries in the BOD 180 tagged with the previous PME to eliminate Key space ranges made invalid by SCSI Unmap and volume delete operations by omitting the entries with keys in those ranges found in the Volume Map 150 and frozen tablets 130 from the new VMV shard 420 under construction. The physical locations associated with the omitted entries are marked for potential release to the free pool.

The exemplary VMV reconstruction process 400 optionally includes one or more Space Accounting sub-processes 430, such as an exemplary sparse bitmap reconstruction sub-process 500, as discussed further below in conjunction with FIGS. 5A and 5B.

FIG. 4B illustrates exemplary pseudo code for a write operation process 450 according to a sparse bitmap embodiment of the disclosure. As shown in FIG. 4B, the exemplary write operation process 450 processes, as inputs, a Shard Lower Bound (SLB), a Shard Upper Bound (SUB), and a TabletAndMapRefs[ ] value. During step 1, for each tablet and/or map, the exemplary write operation process 450 performs the following steps:

Each cursor is set at the first entry of its tabletOrMap value that is greater than or equal to the SLB, as follows:
Cursor[tablet]=FindGreaterOrEqualEntry(TabletAndMapRef[tablet], SLB)
If the cursor hits notfound, or exceeds the SUB during step 1.a, then:
If (Cursor[tablet]==Ø OR Cursor[tablet].Key>SUB), then, disable the cursor.
During step 2, the value of MinCursorKey is set to SUB. For each tablet and/or map, the following tasks are performed during step 3 (in order from oldest to newest (map being oldest)):
Find most recent version of the lowest key by determining if (Cursor[tablet].Key<=
MinCursorKey, and if so, set the following variables:
MinTablet=tablet
MinCursorKey=Cursor[tablet].Key The cursor address and value are appended to the new shard, and the cursors are incremented at the MinCursorKey, during step 4, as follows:
Append(NewShard, Cursor[MinTablet])
For each tablet, the exemplary write operation process 450 performs the following test during step 5:
If (Cursor[tablet].Key==MinCursorKey) (incrementing the cursors at MinCursorKey),
then:
Cursor[tablet]=FindGreaterThanEntry(TabletOrMapRef[MinTablet], MinCursorKey)
If (Cursor[tablet]==Ø OR Cursor[tablet].Key>SUB), then, disable the cursor.
If any cursors are still enabled, the process 450 returns to Step 2.

Once a shard of the new VMV 420 (FIG. 4A) is complete, it is put into service (e.g., it is made accessible to the read traffic. In one or more embodiments, this is done by replacing a small number of the references to the shard of the old VMV with references to the new VMV. Thereafter, the shard of the old VMV is discarded. In this way, in one or more embodiments, the virtual volume appliance 100 only needs to reserve space for minimally one shard reconstruction at a time In one or more embodiments, the only moment of contention is when a shard is placed into service. This is an infrequent event as compared to operation rates, so its impact on throughput is negligible.

After all the shards have been reconstructed and placed into service, the Cuckoo Filter 140 is cleared of the contents of the used frozen tablets 130 and optionally written out to disk. The BOD 180 is cleared of all entries of the previous PME. The used frozen tablets 130 are discarded. The identification numbers of the used frozen tablets 130 are returned to a Free Pool to be assigned to new tablets.

Space Accounting

The pre-mapper 110 presents a challenge for space accounting, because data in the pre-mapper 110 is not reconciled with data in the Volume Map 150 until VMV reconstruction is performed by the exemplary VMV reconstruction process 400. Space accounting is the means to track the disk usage. In other words, if a key K is written and stored in the pre-mapper 110, it is not known if K already exists in the Volume Map 150. Therefore, space accounting does not know if it should account for the write of K as a new write or as an overwrite.

A number of variations are presented for handling this challenge. In one embodiment, the virtual volume appliance 100 does not perform any space accounting for write operations to the pre-mapper 110. Space accounting is performed only during VMV reconstruction by the exemplary VMV reconstruction process 400. This embodiment is suitable for applications in which performance is imperative and timely space accounting is not a concern. This embodiment is sufficient to have accurate accounting of the Volume Map 150, without incurring any contention.

In another embodiment, the virtual volume appliance 100 keeps separate counters for storage in the pre-mapper 110 and the Volume Map 150. The virtual volume appliance 100 reads the Cuckoo Filter 140 before adding the new key K to the Cuckoo Filter 140. This is not a significant performance issue, because updates to the Cuckoo Filter 140 require reading the Cuckoo Filter 140. If K exists in the Cuckoo Filter 140, then the virtual volume appliance 100 searches the identified Tablet for K. If no entry is found in the Cuckoo Filter 140 or Tablet, then the pre-mapper 110 counter is incremented for the write operation, otherwise the counter is not incremented. The Volume Map counters are incremented during VMV reconstruction by the exemplary VMV reconstruction process 400. In this embodiment, there is some short-term space accounting, which can provide a reasonable estimate of the upper bound of space usage, since the Volume Map 150 and pre-mapper 110 usage is known, without incurring any contention.

In yet another embodiment, only one counter is used for space usage. The virtual volume appliance 100 does a read of the pre-mapper 110 for K as described in the prior embodiment. If key K is not found, however, then the virtual volume appliance 100 does a read of the Volume Map 150. If K is not found in the Volume Map 150, then the space usage counters are incremented, otherwise the space usage counters are not incremented. In this embodiment, the space usage is substantially always current at the cost of an extra read of the pre-mapper 110 or Volume Map 150, without incurring any contention.

Figure 5A:
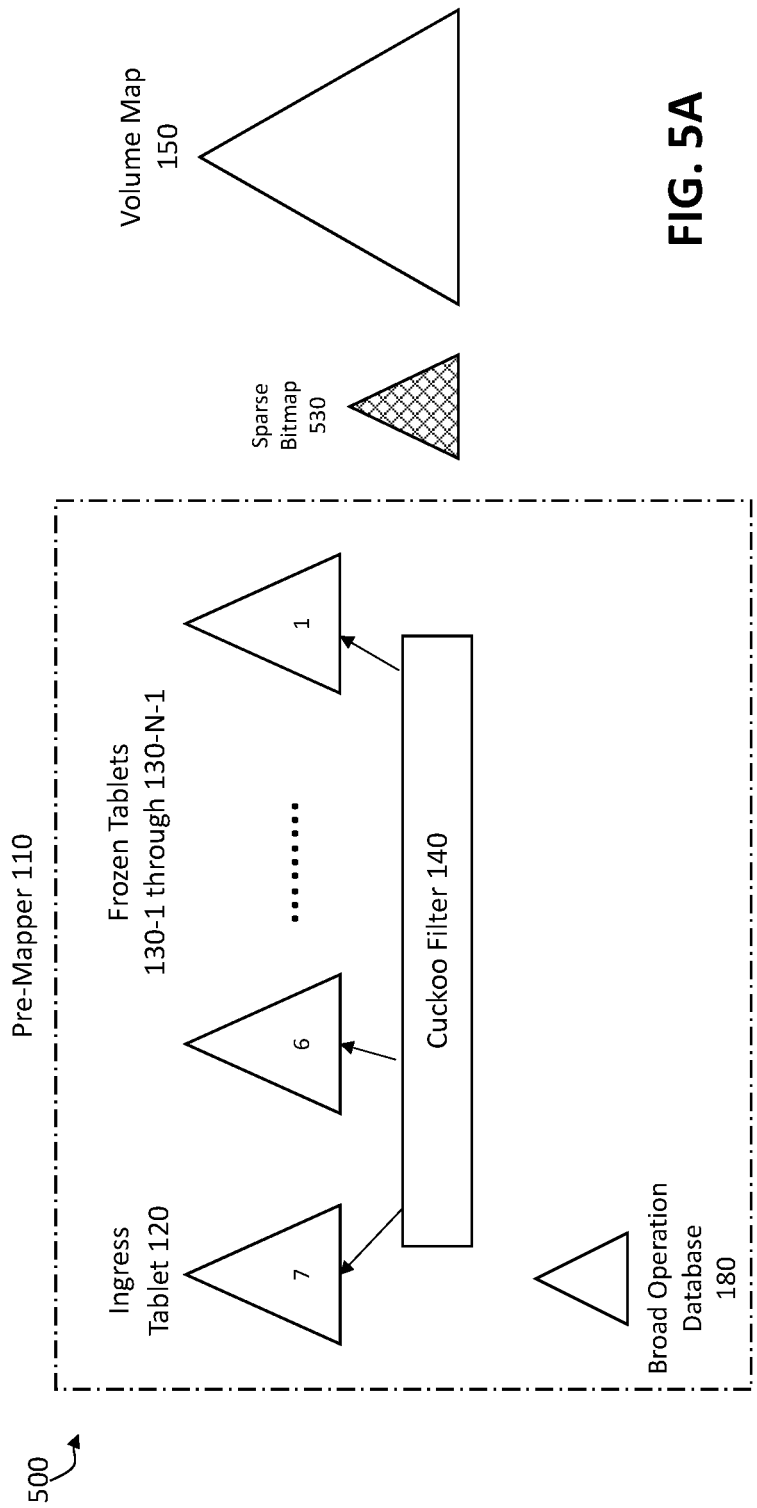
FIG. 5A illustrates an exemplary sparse bitmap Reconstruction sub-process, according to one space accounting embodiment of the disclosure.

FIG. 5A illustrates an exemplary sparse bitmap reconstruction sub-process 500 according to one space accounting embodiment of the disclosure. One or more space accounting embodiments of the disclosure recognize that if the Volume Map 150 is large, then the search of the Volume Map 150 can be costly. First, the search of the Volume Map 150 as part of the processing of a write operation is common, because most applications do not write to the same location within short periods of time, such as a 15 minute pre-mapper VMV reconstruction interval. Therefore, the search for the data offset K will seldom hit in the pre-mapper 110. Rather, the Volume Map 150 is searched.

If the Volume Map 150 is large, then the level 0 (i.e., bottom) and level 1 nodes of the Volume Map 150 are unlikely to be in the cache due to read traffic (and will likely be stored on disk). Therefore, there is a significant probability that a search for a Write IO operation must do two reads of the disk-based nodes in order to get the level 0 and then level 1 nodes of the Volume Map 150. Given that the base operation of the pre-mapper 110 requires minimal access to the physical media, this is a significant cost to performance.

Among other benefits, the exemplary space accounting embodiment of FIG. 5A reduces the probability that the search needed to do timely Space Accounting requires more than one access to a disk-based node to negligible levels. In the embodiment of FIG. 5A, the pre-mapper 110 and volume mapper 150, repeated from the embodiment of FIG. 1, employ the same label numbers.

As shown in FIG. 5A, the exemplary space accounting embodiment further comprises a sparse bitmap 530 constructed like a tree, in a similar manner as a Sparse Array or a B-Tree. Each page in a given volume is represented by a single bit. The sparse bitmap 530 behaves in a substantially similar manner as the Volume Map 150 when it comes to clone support, as in a Shadowing B-Tree or Array. In one or more embodiments, the exemplary sparse bitmap 530 is so dense that the Level 1 and higher nodes can be assumed to be in memory, except during recovery and/or cold start conditions.

FIG. 5B illustrates exemplary pseudo code for a write operation process 550 according to a sparse bitmap embodiment of the disclosure. As shown in FIG. 5B, during a write of a key K during step 560, the virtual volume appliance 100 determines if the write is a new write operation or an overwrite write operation by first searching the pre-mapper for key K. This is generally a fast search, because it typically only requires a search of the Cuckoo Filter 140 of the pre-mapper 110, which is an in-memory hash search for the exemplary embodiments. If the pre-mapper search misses, the virtual volume appliance 100 searches the sparse bitmap 530 during step 570 for key K. If either the pre-mapper 110 or the sparse bitmap 530 have an entry for key K during step 580, then the write is an overwrite operation, otherwise the write is a new write operation.

The sparse bitmap Version (SBV) is reconstructed when the new Volume Map Version (VMV) is constructed, in a similar manner as the VMV reconstruction process 400 of FIG. 4A.

Recovery

Figure 6A:
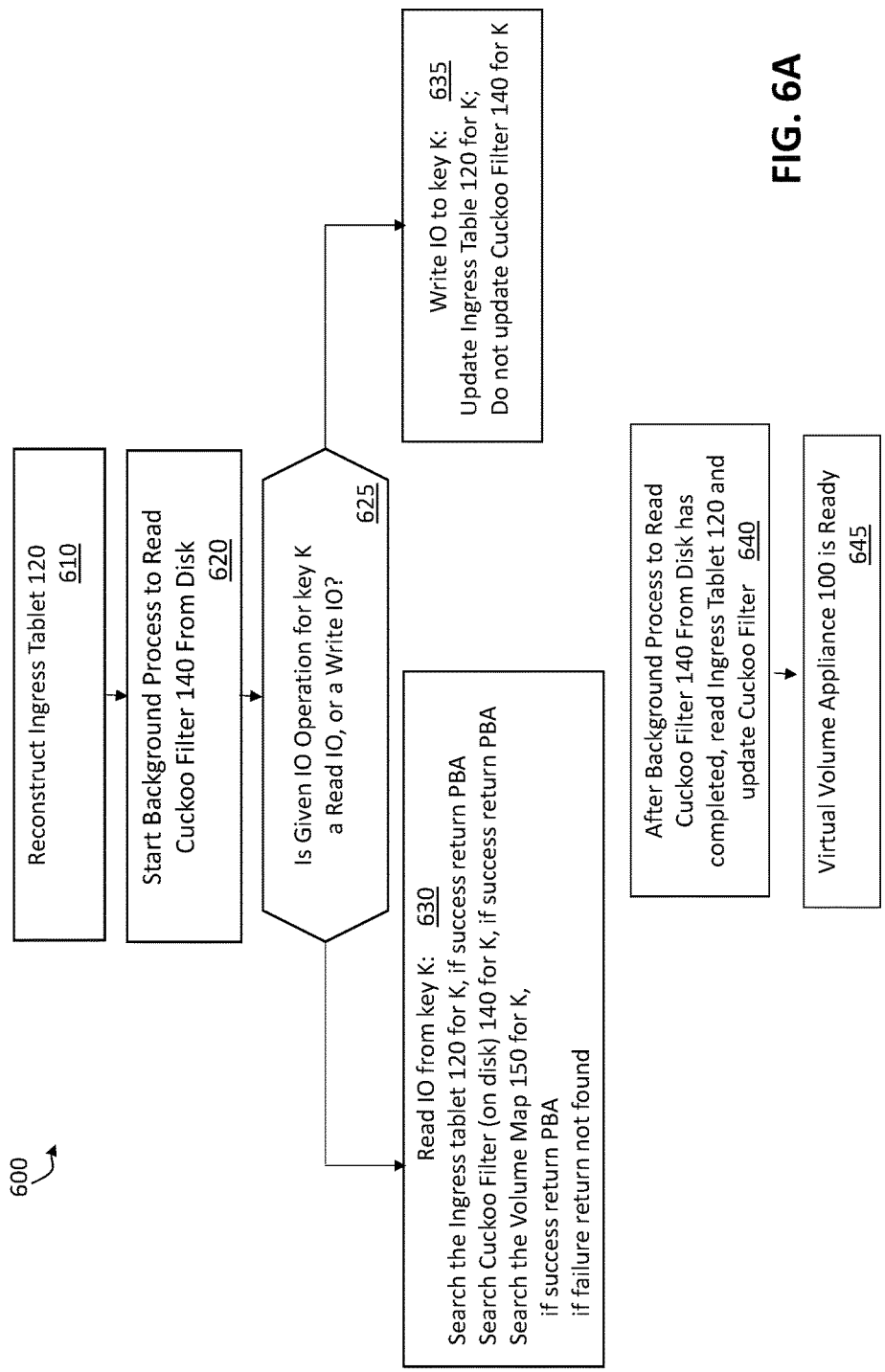
FIGS. 6A and 6B illustrate exemplary alternative implementations of a recovery process, according to embodiments of the disclosure.

If the virtual volume appliance 100 were to crash, then the contents of the ingress tablet 120 are no longer in memory, nor are the latest changes to the Cuckoo Filter 140. FIG. 6A illustrates an exemplary implementation of a recovery process 600, according to one embodiment of the disclosure. In one or more embodiments, the virtual volume appliance 100 or its standby starts up by implementing the exemplary recovery process 600, as follows:

1) Reconstruct the ingress tablet 120, typically by reading its log, during step 610.

2) Start a background process during step 620 to read the Cuckoo Filter 140 from disk.

3) A test is performed during step 625 to determine if a given IO operation for key K is a read IO, or a write IO.

4) A Read IO from key K operates during step 630, as follows:
 a) Search the Ingress tablet 120 for K, and if K is found, return the PBA.
 b) Search the Cuckoo Filter 140 (on disk) for K, and if K is found, return the PBA. The Cuckoo Filter 140 will be on disk, in one or more embodiments, but since a Cuckoo Filter 140 read requires at most two reads, the read IO will still meet SCSI time out requirements.
 c) Search the Volume Map 150 for K, and if K is found, return the PBA (and if K is not found, return NotFound).

5) A Write IO to key K operates during step 635, as follows:
 a) Update the Ingress Table 120 for K.
 b) Do not update the Cuckoo Filter 140 for K, because it is not fully in memory yet.

Once the background process started during step 620 to read the Cuckoo Filter 140 has completed, the ingress tablet 120 is read and the Cuckoo Filter 140 is updated during step 640. The virtual volume appliance 100 is then ready during step 645.

Figure 6B:
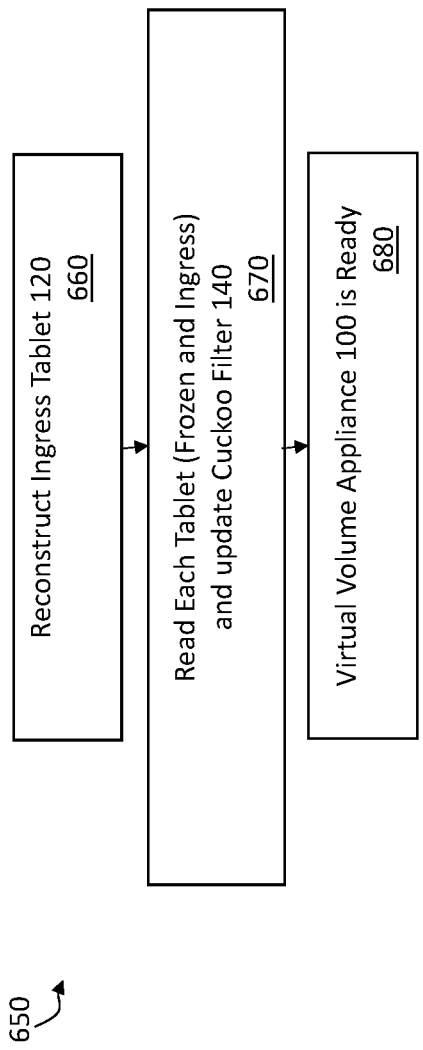

FIG. 6B illustrates an exemplary alternative implementation of a recovery process 650, according to one embodiment of the disclosure. As shown in FIG. 6B, the exemplary recovery process 650 initially reconstructs the ingress tablet 120, typically by reading its log, during step 660. The ingress tablet 120 and frozen tablets 130 are read during step 670. Finally, the virtual volume appliance 100 is ready during step 680.

Generally, the recovery process 650 of FIG. 6B supports an embodiment where the Cuckoo Filter 140 is not written to disk. In the embodiment of FIG. 6B, the ingress tablet 120 and mapping tablets 130 are read and the Cuckoo Filter 140 is updated accordingly, before the virtual volume appliance 100 can be used for IO.

Volume Cloning when Using a Premapper

Metadata cloning comprises making a copy of a Volume using metadata changes only. For example, metadata cloning is done in Shadowing B-Tree by creating a new root. See, for example, Ohad Rodeh, "B-Trees, Shadowing, and Clones," ACM Trans. on Computational Logic, Vol. V, No. N (August 2007), incorporated by reference herein in its entirety. Such Volume Cloning is a feature often required of a Volume mapping apparatus, such as the disclosed virtual volume appliance 100.

One or more embodiments of the disclosure provide the ability to clone volumes, when using the pre-mapper 110 with the following restriction: both the original volume and its clone get a new key range after the clone event. This is considered a minor restriction, because it is as if both original volume and its clone are cloned from the original. In practice, an internal identification of a volume is the outer part of the key range. Thus, this requires both the original volume and its clone to get new internal identifications. It is noted that the remapping of the original volume is not necessary if the original volume is designated as read-only. The original range of the keys is referred to as the parent range of the two new ranges.

Three aspects of the pre-mapper 110 of FIG. 1 are potentially impacted by the disclosed volume cloning techniques: the BOD 180, the read path and the VMV reconstruction process 400 (FIG. 4A), as discussed hereinafter. In one or more embodiments, each clone event is written into the BOD 180 indicating that the two new ranges are cloned from the original ranges.

The write path should only use the new key ranges assigned to the two volumes. The write path should consult the BOD 180 before completing a write operation to ensure that no more writes occur to the former range of the original volume until the former range has been cleared from the BOD 180 during the VMV reconstruction process 400.

FIG. 7A illustrates exemplary pseudo code for a read operation process 700, according to a volume cloning embodiment of the disclosure. As shown in FIG. 7A, during a read operation, the read path operates as follows for a volume, given a volume address B, which is converted to key K by including the range:

1. Search the pre-mapper 110 during step 710 for key K assigned to the volume. If hit, return the found associated data, otherwise continue.
2. Search the BOD 180 for key K during step 720 to find the parent range associated with the volume. Then, convert volume address B to use the key L within the parent range. Then, search pre-mapper 110 again for key L. If hit, return the found associated data, otherwise continue.
3. Search the BOD 180 for the associated parent range during step 730 to find the grandparent range. If found, then go back to step 720 using the grandparent range as the parent range. If not found, then continue.
4. Search the Volume during step 740 for last used key (K, L, . . . ). If hit, return the found associated data, otherwise return NotFound.

FIG. 7B illustrates an exemplary VMV reconstruction process 750, according to a volume cloning embodiment of the disclosure. As shown in FIG. 7B, the exemplary VMV reconstruction process 750 increments the Pre-mapper Epoch (PME) during step 755, with all new entries tagged with the new PME value. The exemplary VMV reconstruction process 750 then selects the entries in the BOD 180 during step 760 tagged with the previous PME value; and sorts the selected BOD entries during step 765 such that for each existing key range, its ancestry is known.

The exemplary VMV reconstruction process 750 shards the VMV construction during step 770, such that the key ranges that share ancestry are together in a shard. For a given ancestry within a shard, during step 775, the following steps are performed:

Reconstruct the ancestral range of the ancestry in the new VMV by running the VMV reconstruction process 400 (FIG. 4A) with, as inputs, the Lower and Upper Bounds of the ancestral range; the frozen tablets from the previous PME and the volume map;

When the ancestral range is complete, reconstruct the child ranges of the ancestral range in a new VMV by running Step 775a, with each child range as the ancestral range; and Step 775.b is re-executed during step 775.c for the grandchild ranges, and so on.

When the shard is constructed, the shard is exchanged with the previous shard in the volume map during step 780, and then the previous shard is deleted. All entries are removed from the Cuckoo Filter 140 associated with the shard during step 785.

When all the shards have been constructed, the following steps are performed during step 790:

Delete the entries in the BOD 180 that are tagged with the previous PME; and Delete the frozen tablets 120 associated with the previous PME.

The following table illustrates exemplary cloning entries in the BOD 180:

| Parent Range | Child 0 Range | Child 1 Range |
|---|---|---|
| 0 . . . 99 | 100 . . . 199 | 200 . . . 299 |
| 200 . . . 299 | 300 . . . 399 | 400 . . . 499 |
| 400 . . . 499 | 500 . . . 599 | 600 . . . 699 |

Figure 7C:
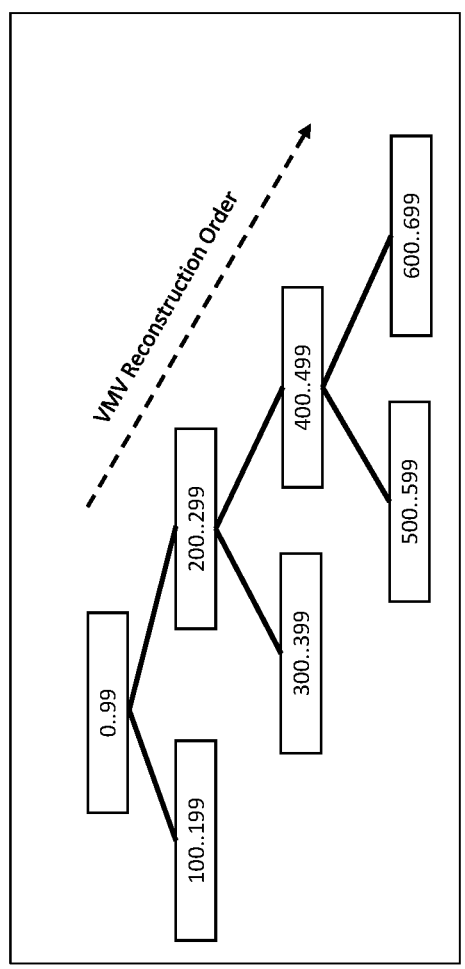
FIG. 7C illustrates an exemplary key range ancestral tree, according to one embodiment of the disclosure.

FIG. 7C illustrates an exemplary key range ancestral tree 780, corresponding to the BOD cloning entries indicated in the above table, according to one embodiment. As shown in FIG. 7C, the VMV reconstruction process 750 (FIG. 7B) proceeds from the root node to the leaf nodes.

In one or more embodiments, existing pipelining techniques are optionally employed that delay the VMV reconstruction process 750 (FIG. 7B) until ample time has passed for the Ingress Tablet 120 to be frozen, in the manner described above. In this manner, impacted parental ranges are in frozen tablets before VMV reconstruction starts. Otherwise, there would be a potential burden on the implementation; particularly, if a clone event happens shortly before the end of a Pre-mapper Epoch.

Alternative Embodiment

In one variation, the pre-mapper 110 can be implemented as a Log Structure Merge Tree. See, for example, P. E. O'Neil et al., "The Log-Structured Merge-Tree (LSM-tree)," *Acta Informatica* Vol. 33, No. 4, 351-385 (June 1996), incorporated by reference herein in its entirety. In such an embodiment, the Volume Map 150 is the largest tablet and the ingress tablet 120 is the first tablet, referred to as Co. Bloom Filters are typically used instead of a Cuckoo Filter 140 to accelerate searches. The intermediate frozen tablets 130 are merged from Co.

CONCLUSION

One or more embodiments of the disclosure provide mapping methods and mapping apparatus for identifying the physical storage location of a given data item. The foregoing applications and associated embodiments should be considered as illustrative only, and numerous other embodiments can be configured using the techniques disclosed herein, in a wide variety of different applications.

It should also be understood that the disclosed mapping techniques for identifying the physical storage location of a given data item, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed mapping techniques for identifying the physical storage location of a given data item may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a virtual volume appliance 100, or portions thereof, are illustratively implemented for use by tenants of such a multi-tenant environment.

Cloud infrastructure as disclosed herein can include cloud-based systems such as Amazon Web Services (AWS), GCP and Microsoft Azure. Virtual machines provided in such systems can be used to implement at least portions of a storage mapping platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the storage mapping devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
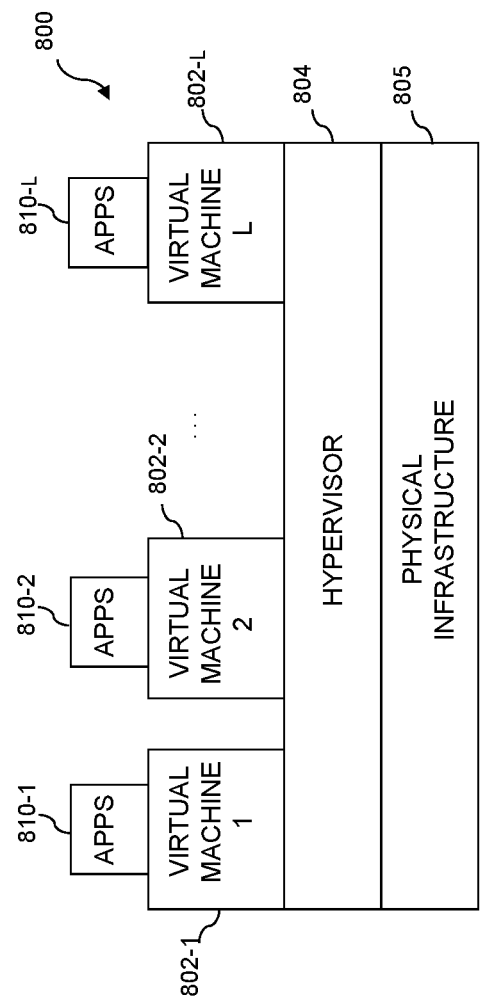
FIG. 8 illustrates an exemplary processing platform that may be used to implement at least a portion of one or more embodiments of the disclosure comprising a cloud infrastructure.

Referring now to FIG. 8, one possible processing platform that may be used to implement at least a portion of one or more embodiments of the disclosure comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-M under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 804 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products, such as VNX™ and Symmetrix VMAX™, both commercially available from Dell EMC. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed mapping apparatus for identifying the physical storage location of a given data item may each run on a computer, server, storage device or other processing platform element. A given such element may be viewed as an example of what is more generally referred to herein as a "processing device." The cloud infrastructure 800 shown in FIG. 8 may represent at least a portion of one processing platform.

Figure 9:
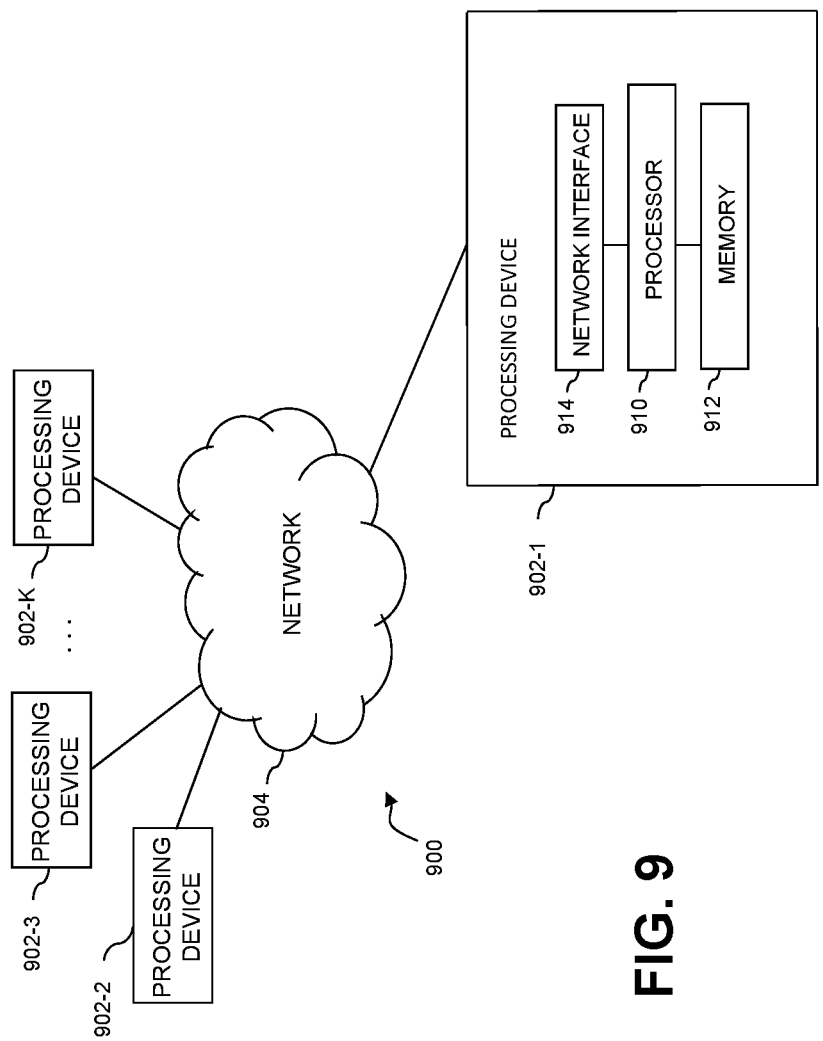
FIG. 9 illustrates another exemplary processing platform that may be used to implement at least a portion of one or more embodiments of the disclosure.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIGS. 3, 4A, 4B, 5B, 6, 7A and 7B are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A mapping apparatus, comprising:
a mapper that translates from an input key to an output key in one or more storage devices;
a pre-mapper for processing update operations, wherein said pre-mapper comprises a plurality of mapping tablets and an in-memory look-up filter to identify a given mapping table storing a given input key, wherein said plurality of mapping tablets comprises at least one dynamic in-memory ingress tablet and a plurality of persisted frozen tablets,
wherein, for a given received update operation, a first entry is added to one of said at least one dynamic in-memory ingress tablets comprising said input key for said given received update operation and a corresponding output key where data for said given received update operation is stored in said one or more storage devices; and a second entry is added to said look-up filter comprising said input key of said first entry and an identifier of said one dynamic in-memory ingress tablet storing said first entry for said given received update operation; and at least one processing device configured to perform the following steps when said at least one dynamic in-memory ingress tablet satisfies one or more predefined capacity criteria:

persisting said at least one dynamic in-memory ingress tablet as one of said plurality of persisted frozen tablets; and establishing a new dynamic in-memory ingress tablet, wherein said at least one processing device is further configured to perform a space accounting to account for a usage of said one or more storage devices by a given write operation of a given data offset as one of a new write operation and an overwrite operation.

2. The mapping apparatus of claim 1, wherein said space accounting is performed during a creation of a new version of the mapper when a predefined mapper criteria is satisfied based on the combined contents of the pre-mapper and the prior version of the mapper.

3. The mapping apparatus of claim 1, wherein said space accounting comprises reading one or more of the look-up table and the plurality of mapping tablets during a given write operation for a given data offset and incrementing a pre-mapper counter for the given write operation if said given data offset is not stored in one or more of the look-up table and one of said mapping tablets.

4. The mapping apparatus of claim 3, wherein said space accounting comprises incrementing a mapper counter during a creation of a new version of the mapper when a predefined mapper criteria is satisfied based on the combined contents of the pre-mapper and the prior version of the mapper.

5. The mapping apparatus of claim 1, wherein said space accounting comprises reading one or more of the look-up table, the plurality of mapping tablets and the mapper during a given write operation for a given data offset and incrementing a counter for the given write operation if said given data offset is not stored in one or more of the look-up table, one of said mapping tablets and the mapper.

6. The mapping apparatus of claim 1, wherein said at least one processing device is further configured to maintain a sparse bitmap where each page in a given volume is represented by a single bit and to determine if the given write operation of the given data offset is one of said new write operation and said overwrite operation by searching at least one of said pre-mapper and said sparse bitmap for said given data offset.

7. The mapping apparatus of claim 6, wherein said sparse bitmap is implemented using one or more of a Sparse Array and a B-Tree.

8. A mapping method, comprising the steps of:

translating from an input key to an output key in one or more storage devices using a mapper;

processing update operations using a pre-mapper comprising a plurality of mapping tablets and an in-memory look-up filter to identify a given mapping table storing a given input key, wherein said plurality of mapping tablets comprises at least one dynamic in-memory ingress tablet and a plurality of persisted frozen tablets, performing the following steps for a given received update operation using at least one processing device:

adding a first entry to one of said at least one dynamic in-memory ingress tablets comprising said input key for said given received update operation and a corresponding output key where data for said given received update operation is stored in said one or more storage devices; and adding a second entry to said look-up filter comprising said input key of said first entry and an identifier of said one dynamic in-memory ingress tablet storing said first entry for said given received update operation;

performing the following steps, using said at least one processing device, when said at least one dynamic in-memory ingress tablet satisfies one or more predefined capacity criteria:

persisting said at least one dynamic in-memory ingress tablet as one of said plurality of persisted frozen tablets; and establishing a new dynamic in-memory ingress tablet; and performing a space accounting to account for a usage of said one or more storage devices by a given write operation of a given data offset as one of a new write operation and an overwrite operation.

9. The mapping method of claim 8, wherein said space accounting is performed during a creation of a new version of the mapper when a predefined mapper criteria is satisfied based on the combined contents of the pre-mapper and the prior version of the mapper.

10. The mapping method of claim 8, wherein said space accounting comprises reading one or more of the look-up table and the plurality of mapping tablets during a given write operation for a given data offset and incrementing a pre-mapper counter for the given write operation if said given data offset is not stored in one or more of the look-up table and one of said mapping tablets.

11. The mapping method of claim 10, wherein said space accounting comprises incrementing a mapper counter during a creation of a new version of the mapper when a predefined mapper criteria is satisfied based on the combined contents of the pre-mapper and the prior version of the mapper.

12. The mapping method of claim 8, wherein said space accounting comprises reading one or more of the look-up table, the plurality of mapping tablets and the mapper during a given write operation for a given data offset and incrementing a counter for the given write operation if said given data offset is not stored in one or more of the look-up table, one of said mapping tablets and the mapper.

13. The mapping method of claim 8, further comprising the step of maintaining a sparse bitmap where each page in a given volume is represented by a single bit and to determine if the given write operation of the given data offset is one of said new write operation and said overwrite operation by searching at least one of said pre-mapper and said sparse bitmap for said given data offset.

14. The mapping method of claim 13, wherein said sparse bitmap is implemented using one or more of a Sparse Array and a B-Tree.

15. A computer program product, comprising a non-transitory machine-readable storage medium having encoded therein executable code of one or more software programs, wherein the one or more software programs when executed by at least one processing device perform the following steps:

translating from an input key to an output key in one or more storage devices using a mapper;

processing update operations using a pre-mapper comprising a plurality of mapping tablets and an in-memory look-up filter to identify a given mapping table storing a given input key, wherein said plurality of mapping tablets comprises at least one dynamic in-memory ingress tablet and a plurality of persisted frozen tablets, performing the following steps for a given received update operation using at least one processing device:

adding a first entry to one of said at least one dynamic in-memory ingress tablets comprising said input key for said given received update operation and a corresponding output key where data for said given received update operation is stored in said one or more storage devices; and adding a second entry to said look-up filter comprising said input key of said first entry and an identifier of said one dynamic in-memory ingress tablet storing said first entry for said given received update operation;

performing the following steps, using said at least one processing device, when said at least one dynamic in-memory ingress tablet satisfies one or more predefined capacity criteria:

persisting said at least one dynamic in-memory ingress tablet as one of said plurality of persisted frozen tablets; and establishing a new dynamic in-memory ingress tablet; and performing a space accounting to account for a usage of said one or more storage devices by a given write operation of a given data offset as one of a new write operation and an overwrite operation.

16. The computer program product of claim 15, wherein said space accounting is performed during a creation of a new version of the mapper when a predefined mapper criteria is satisfied based on the combined contents of the pre-mapper and the prior version of the mapper.

17. The computer program product of claim 15, wherein said space accounting comprises reading one or more of the look-up table and the plurality of mapping tablets during a given write operation for a given data offset and incrementing a pre-mapper counter for the given write operation if said given data offset is not stored in one or more of the look-up table and one of said mapping tablets.

18. The computer program product of claim 17, wherein said space accounting comprises incrementing a mapper counter during a creation of a new version of the mapper when a predefined mapper criteria is satisfied based on the combined contents of the pre-mapper and the prior version of the mapper.

19. The computer program product of claim 15, wherein said space accounting comprises reading one or more of the look-up table, the plurality of mapping tablets and the mapper during a given write operation for a given data offset and incrementing a counter for the given write operation if said given data offset is not stored in one or more of the look-up table, one of said mapping tablets and the mapper.

20. The computer program product of claim 15, further comprising the step of maintaining a sparse bitmap where each page in a given volume is represented by a single bit and to determine if the given write operation of the given data offset is one of said new write operation and said overwrite operation by searching at least one of said pre-mapper and said sparse bitmap for said given data offset.

* * * * *

UNITED STATES PATENT AND TRADEMARK OFFICE
CERTIFICATE OF CORRECTION

PATENT NO. : 10,210,067 B1  
APPLICATION NO. : 15/662727  
DATED : February 19, 2019  
INVENTOR(S) : Joris Wils Page 1 of 1

It is certified that error appears in the above-identified patent and that said Letters Patent is hereby corrected as shown below:

On the Title Page

Item [57], In Line 5, replace "to identify a given mapping table storing" with -- to identify a given mapping tablet storing --

In the Specification

Column 1, Line 46, replace "to identify a given mapping table storing" with -- to identify a given mapping tablet storing --

In the Claims

Column 18, Lines 55-56, Claim 1, replace "to identify a given mapping table storing" with -- to identify a given mapping tablet storing --

Column 19, Line 59, Claim 8, replace "to identify a given mapping table storing" with -- to identify a given mapping tablet storing --

Column 20, Line 66, Claim 15, replace "to identify a given mapping table storing" with -- to identify a given mapping tablet storing --

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*